No. 672,217. Patented Apr. 16, 1901.
E. M. NOYES.
PNEUMATIC TIRE VALVE TOOL.
(Application filed June 23, 1900.)
(No Model.)
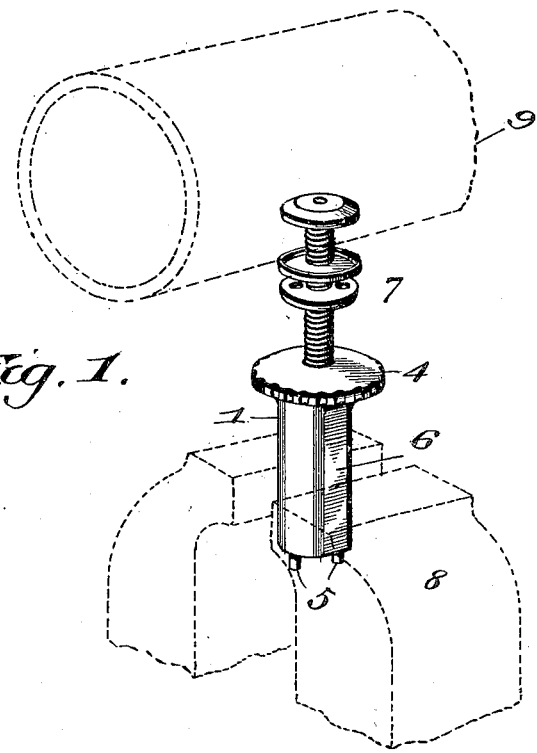
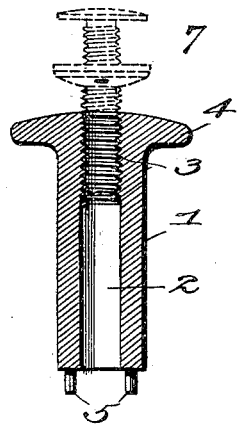
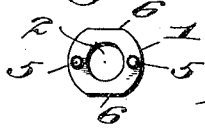
Witnesses
Inventor
Edward M. Noyes
Attorneys

UNITED STATES PATENT OFFICE.

EDWARD M. NOYES, OF ASHTABULA, OHIO.

PNEUMATIC-TIRE-VALVE TOOL.

SPECIFICATION forming part of Letters Patent No. 672,217, dated April 16, 1901.

Application filed June 23, 1900. Serial No. 21,380. (No model.)

*To all whom it may concern:*

Be it known that I, EDWARD M. NOYES, a citizen of the United States, residing at Ashtabula, in the county of Ashtabula and State of Ohio, have invented a new and useful Pneumatic-Tire-Valve Tool, of which the following is specification.

My invention relates to pneumatic-tire-valve tools; and it has for its object to produce a device of this kind which will be simple, cheap, and efficient; and it consists in the improved construction of the same, as will be hereinafter more fully set forth.

In the accompanying drawings, in which the same reference-numerals indicate corresponding parts in each of the views in which they occur, Figure 1 is a perspective view of my improved valve-tool in use, the tire and vise being shown in dotted lines. Fig. 2 is a longitudinal sectional view of the tool, the valve being shown in dotted lines; and Fig. 3 is a bottom plan view.

In using the ordinary all-metal or metal-base valves for pneumatic tires it is necessary that the base or flange of the valve be inserted through an opening made in the tire. After the head has been inserted it is then necessary that the nut or washer be screwed down toward the same as rigidly as possible, so as to clamp the wall of the tire between the flange and the washer to prevent the escape of air. To perform these operations expeditiously, I have invented an improved tool, which comprises a body portion 1, which is perforated longitudinally, as shown at 2, and interiorly screw-threaded at one end, as shown at 3. The screw-threaded end is preferably provided with a flange 4, which may be slightly convex upon its exterior and has its edge scalloped or roughened to afford a better grip for the hand of the operator. The other end, which is preferably cut off squarely, is provided with two projecting pins 5 upon opposite sides of the body, which is otherwise preferably cylindrical and flattened, as shown at 6.

In using my improved valve-tool the valve 7 is inserted in the screw-threaded end of the tool a sufficient distance to be held rigidly thereby. The tool is then placed within a vise 8, and the tire 9 is placed upon the valve and the base of the valve is forced through the hole in the tire by the operator in the usual manner. By securing the tool and the valve rigidly in this manner both hands of the operator are free to manipulate the tire, with the result that the valve may be inserted very quickly. As soon as the valve has been inserted into the tire the tool is removed from the vise and unscrewed from the valve. The tool is then turned end for end and slipped over the outer end of the tire until the two pins or projections thereon enter the openings in the washer of the valve, the tool being slightly counterbored or enlarged to permit of its slipping over the stem of the valve. The tool is then rotated by the hand, the head of it serving as a handle, which will cause the washer to be screwed down tight against the tire in the usual manner. After the valve has been secured the tool is slipped off the valve and is ready for use upon another valve, either as a vise for holding the valve-stem or as a wrench for turning the nut or washer. The valve may be as quickly loosened and removed from the tire with the tool by simply reversing the foregoing operation. If it be desired to tighten the nut upon the valve at any time to prevent leakage, it can be easily done by slipping the smaller end over the valve-stem until the projections enter the holes in the nut of the valve, when a partial rotation will screw the nut down against the tire with sufficient force to render it perfectly air-tight.

Having thus fully described my invention, what I claim as new, and desire to secure by Letters Patent, is—

1. As a new article of manufacture, a pneumatic-tire-valve tool comprising a body, one end of which is provided with a screw-threaded perforation for holding the valve rigidly therein and the other end is provided with means for engaging with the washer of the valve, substantially as described.

2. As a new article of manufacture, a pneumatic-tire-valve tool comprising a longitudinally-perforated body, one end of which body is enlarged to form a handle, and the perforation at that end is screw-threaded for holding the valve, and the other end of the body is provided with means for engaging with the washer of the valve, substantially as described.

3. As a new article of manufacture, a pneumatic-tire-valve tool comprising a substantially cylindrical body, the sides of which are flattened and one end is enlarged to form a handle and is provided with means for holding the valve, and the other end is provided with means for engaging with the washer of the valve, substantially as described.

4. As a new article of manufacture, a pneumatic-tire-valve tool comprising a longitudinally-perforated body, one end of which is enlarged to form a handle and the other end is provided with pins for engaging with the washer of the valve, the end of the perforation at the larger end of the body being screw-threaded and the other end being counterbored, substantially as described.

EDWARD M. NOYES.

Witnesses:
S. L. SCRIVENS,
F. R. HOGUE.